(12) United States Patent
Seegel et al.

(10) Patent No.: US 9,914,246 B2
(45) Date of Patent: Mar. 13, 2018

(54) GRANULATED MATERIAL USED IN A LIQUID COMPOSITE MOULDING PROCESS

(71) Applicant: Airbus Operations GmbH, Hamburg (DE)

(72) Inventors: Hauke Seegel, Hamburg (DE); Claus Fastert, Hamburg (DE); Lionel Winkelmann, Hamburg (DE); Paulin Fideu Siagam, Hamburg (DE)

(73) Assignee: Airbus Operations GmbH (DE)

( * ) Notice: Subject to any disclaimer, the term of this patent is extended or adjusted under 35 U.S.C. 154(b) by 741 days.

(21) Appl. No.: 14/333,605

(22) Filed: Jul. 17, 2014

(65) Prior Publication Data
US 2015/0028525 A1  Jan. 29, 2015

(30) Foreign Application Priority Data
Jul. 23, 2013  (EP) .................... 13177636

(51) Int. Cl.
*B29C 43/56* (2006.01)
*B29C 70/44* (2006.01)
*B29C 43/36* (2006.01)
*B29K 303/00* (2006.01)

(52) U.S. Cl.
CPC .......... *B29C 43/56* (2013.01); *B29C 43/3642* (2013.01); *B29C 70/443* (2013.01); *B29C 2043/561* (2013.01); *B29K 2303/00* (2013.01); *B29K 2911/00* (2013.01)

(58) Field of Classification Search
None
See application file for complete search history.

(56) References Cited

U.S. PATENT DOCUMENTS

| 2007/0152379 A1 | 7/2007 | Jacobson |
| 2009/0309268 A1 | 12/2009 | Cavaliere et al. |
| 2013/0069286 A1 | 3/2013 | Heim et al. |

FOREIGN PATENT DOCUMENTS

| DE | 10 2010 062 871 A1 | 6/2011 |
| DE | 10 2011 119046 A1 | 5/2013 |
| FR | 2 898 538 A1 | 9/2007 |
| WO | 2011/080289 A1 | 7/2011 |

OTHER PUBLICATIONS

European Search Report dated Jan. 2, 2014 (EP 13 17 7636).

*Primary Examiner* — Monica Huson
(74) *Attorney, Agent, or Firm* — Lerner, David, Littenberg, Krumholz & Mentlik, LLP

(57) ABSTRACT

A system for liquid composite molding includes a first rigid tool part onto which a semi-finished fiber material is positioned, a first vacuum foil arrangeable on the first rigid tool part to provide a first gastight chamber therebetween having a first port, a second vacuum foil and the first vacuum foil providing a second gastight chamber, and granulated material arranged in the second gastight chamber. The semi-finished fiber material is infusible with a matrix material via the first port. A second port is provided at the second gastight chamber for applying a negative pressure thereto. Therein, the granulated material is adapted for forming a second rigid tool part when negative pressure is applied to the second port. I.e. the first vacuum foil, the second vacuum foil and the granulated material function similarly to a vacuum mattress and may be stiffened and collapsed.

8 Claims, 4 Drawing Sheets

GRANULATED MATERIAL USED IN A LIQUID COMPOSITE MOULDING PROCESS

FIELD OF THE INVENTION

The present invention relates to granulated material employed in a liquid composite moulding process. Particularly, the present invention relates to a system for liquid composite moulding, a method for liquid composite moulding and the use of granulated material for a liquid composite moulding process.

BACKGROUND OF THE INVENTION

Liquid composite moulding (LCM) may for example be employed in different areas of industry for producing composite parts. When producing composites the material may be made at the same time as the structure of the finished part.

For forming the finished part a rigid tool consisting of two separable rigid parts may be used. Alternatively, an open mould process may be used in which only one rigid tool part is provided, e.g. the lower part. A fabric, prepreg layup or thermoplastic material is positioned on the rigid tool part and is covered by a vacuum bag. The vacuum bag is secured to the rigid tool part and a vacuum is applied. Furthermore, resin is infused between the rigid tool part and the vacuum bag. The resin distributes through the fabric. Subsequently, the composite part is cured. For example, an open mould process is known from DE 10 2010 062 871 A1 and WO 2011/080 289 A1.

In the process described above one of the surfaces, e.g. the upper surface, of the composite part is only covered by a vacuum bag and possibly some auxiliary materials during resin infusion and during curing. It may be difficult to achieve a high reproducibility of the quality and shape of the upper surface of the composite part.

BRIEF SUMMARY OF THE INVENTION

There may be a need for a possibility to provide an enhanced reproducibility of the composite part.

According to a first aspect of the present invention a system for liquid composite moulding is provided. The system comprises a first rigid tool part, a first vacuum foil, a second vacuum foil and a granulated material. The first vacuum foil is arrangeable in such a way on the first rigid tool part that a first gastight chamber is provided between the first vacuum foil and the first rigid tool part. A first port is provided at the first gastight chamber in such a way that a semi-finished fiber material positioned between the rigid tool part and the first vacuum foil is infusible with a matrix material via the first port. Between the first vacuum foil and the second vacuum foil a second gastight chamber is provided in which the granulated material is arranged. A second port is provided at the second gastight chamber for applying a negative pressure to the second gastight chamber. The granulated material is adapted for forming a second rigid tool part when negative pressure is applied to the second port.

In other words, the idea of the present invention according to the first aspect is based on providing a system with a first rigid tool part and a second tool part which may be stiffened and collapsed and which may be used as a caul plate. The second tool part may be formed by a first vacuum foil, a second vacuum foil and granulated material contained in the second gastight chamber formed between the first and the second vacuum foils. When necessary, e.g. during positioning and arranging of the semi-finished fiber material, the second tool part is deformable and may be adjusted to the required shape. Moreover, during the infusing of the matrix material and possibly during curing, the second tool part may be hardened by applying a negative pressure or a vacuum to the second gastight chamber. After the infusing and/or curing the second tool part may be collapsed again. Thus, the first vacuum foil, the second vacuum foil and the granulated material may function similarly to a vacuum mattress.

Due to the stiffenable second tool part the system advantageously allows for pressure assisted matrix material infusions. For example, a resin may be provided to the first chamber with the help of a peristaltic pump or an alternative pressurization. This is e.g. not possible with a known open mould process as the usually used deformable materials on top of the semi-finished material will be lifted by accumulating resin supplied under pressure.

The composite part produced with the inventive system is optimally reproducible, particularly with respect to all its surfaces and to its geometric quality. With the use of granulated material, the invention allows to create quickly, easily adaptable, complex shaped and reusable caul plates, which are easy available, not harmful and applicable to high temperature curing. The granulated material may be a good known and certified material. Particularly, granulated materials such as fired clay may be employed at high curing temperatures.

The system for liquid composite moulding and particularly for open moulding may be employed for producing composite parts for example for the skin or the interior of an aircraft. The first rigid tool part may be denoted as a first mould. The first rigid tool part may for example comprise a metal and/or plastics and may be permanently stiff and relatively non-elastic. Therein, the first rigid tool part may correspond to the negative shape of a surface of the composite part to be produced.

The first vacuum foil and the second vacuum foil may each be denoted as a vacuum bag. The vacuum foils are attachable to the first rigid tool part and possibly to each other. For example, a bag sealant tape, a removable adhesive and/or any attachment device such as clips may be used for attaching and gastightly sealing the vacuum foils to the first rigid tool part and/or to each other. The vacuum foils may comprise a plastics material and may be impermeable for gases for example up to a pressure of 1 bar. When the first vacuum foil is sealed to the first rigid tool part a first gastight chamber is formed between the first vacuum foil and the first rigid tool part. Furthermore, when the second vacuum foil is sealed to the first rigid tool part or to the first vacuum foil a second gastight chamber is formed between the first and the second vacuum foil. Thus, the first and second chambers have a common border, namely the first vacuum foil.

A semi-finished fiber material such as a fabric, prepreg layup or thermoplastic material is placed onto the first rigid tool part before the first vacuum foil is sealed to the first rigid tool part. The semi-finished fiber material may be a dry material which together with a matrix material such as a resin forms the finished composite part.

The granulated material may also be denoted as granular material and is arranged between the first and the second vacuum foils. Therein, the granulated material may be a conglomeration of discrete solid, macroscopic particles. The particles may be spherical like beads or may have different shapes. An average diameter of a particle may be greater than 1 μm. Particularly, the diameters of the particles may vary between 1 mm and 2 cm. For example, the granular material may comprise fired clay, sand, rice, coffee, glass beads and/or ball bearings. Preferably, the granulated material has a low density and/or is light weighted. Furthermore, the granulated material is formable and temperature resistant up to temperatures at which the matrix material may be cured, e.g. 180° C.

A first port is provided at the first gastight chamber, i.e. between the first rigid tool part and the first vacuum foil. Therein, the first port may be provided at the first rigid tool part or at the first vacuum foil. The first port may be an opening through which the first gastight chamber is connected to a reservoir of matrix material.

Furthermore, a third port may be provided at the first gastight chamber. The third port may serve for applying a negative pressure or suction to the first gastight chamber. The negative pressure may for example enhance the inflow of the matrix material through the first port. For this purpose the third port may be connected to a negative pressure source.

Moreover, a second port is provided at the second gastight chamber, i.e. between the first vacuum foil and the second vacuum foil. The second port may be provided at the first rigid tool part or at the second vacuum foil. Therein, the second port serves for applying a negative pressure to the second gastight chamber. The negative pressure applied through the second port may be denoted as first negative pressure and the pressure applied through the third port may be denoted as second negative pressure. The first and second negative pressures may differ from each other. Moreover, the second port may be connected to the same or to a different negative pressure source as the third port. Particularly, several first ports, several second ports and/or several third ports may be provided.

The negative pressure applied to the second gastight chamber serves for stiffening the granulated material and providing a second tool part in this way. The arrangement of first vacuum foil, granulated material and second vacuum foil may function as a vacuum mattress when negative pressure is applied to the second gastight chamber. Therein, due to the granulated material a low cost, a flexible and quickly and easily deployable pressurizing and forming tool part is provided.

According to an exemplary embodiment of the present invention the granulated material comprises one of the following materials: fired clay, glass beads, glass sand and plastic granulate. Furthermore, alternative or additional granulated materials such as rice and/or steel ball bearings may be used. Therein, the fired clay may e.g. be Seramis©.

Employing fired clay may be particularly advantageous because fired clay comprises a very low density, i.e. is light weighted. Thus, it does not negatively influence the curing process of the composite part to be produced. Furthermore, fired clay is extremely temperature resistant up to several hundred degrees. Particularly, fired clay balls or particles may be at least temperature resistant up to a curing temperature of e.g. 180° C.

According to a further exemplary embodiment of the present invention the granulated material comprises at least two different sizes of granulate particles. Therein, different sizes may denote different average sizes. E.g. the average diameters of the particles may be different. Alternatively or additionally, different materials may be contained in the granulated material. Employing different sizes of particles enables a better and more exact reproduction of geometric fine structure of the composite part to be produced. As described above it is also possible to use only one size, i.e. similar or identically sized particles.

According to a further exemplary embodiment of the present invention the granulated material is provided in a flexible casing. I.e. an additional layer of material surrounds or encapsulates the granulated material within the second gastight chamber. The flexible casing may also be denoted as an envelope. Furthermore, the flexible casing is deformable and may comprise a non-woven fabric material such as a felt-like cloth or fleece. For example, the flexible casing may comprise a breather material e.g. Airweave©. The granulated material together with the flexible casing may be denoted as a "pillow". Therein, the flexible casing allows for an easy storage, handling and positioning of the granulated material. Furthermore, the flexible casing provides a continuous path for pulling the vacuum from the second gastight chamber.

According to a further exemplary embodiment of the present invention the flexible casing comprises a first cavity and a separate second cavity. The particles of the granulated material in the first cavity have a smaller size than the particles of the granulated material in the second cavity. Therein, a smaller size denotes e.g. a smaller average diameter and/or smaller average volume. Furthermore, the term cavity e.g. may denote a separate chamber. Thus, at least two separate layers of granulate particles with different sizes are provided. In this way, certain structures or surface geometries of the composite part to be finished may be enhanced.

According to a further exemplary embodiment of the present invention the system further comprises a pressurized supply of matrix material. The pressurized supply of matrix material is connected to the first port of the first gastight chamber. The pressurized supply of matrix material may also be denoted as a pressure assisted resin infusion. Therein, the pressurized supply of matrix material may imply a positive pressure exerted onto the resin. The pressure may be exerted continuously or periodically. A pressurized supply of matrix material enhances the distribution of the matrix material within the first gastight chamber. Moreover, the pressurized supply of matrix material may positively influence the permeability or infusion of the matrix material into the semi-finished fiber material.

According to a further exemplary embodiment of the present invention the pressurized supply of matrix material is operable in a pulsating manner. Therein, the pressurized supply of matrix material comprises a peristaltic pump and/or a periodically opening valve. A pulsating manner may denote a periodical or cyclical increase and decrease of the pressure exerted onto the matrix material supplied to the first gastight chamber through the first port. The peristaltic pump and/or the periodically opening and closing valve may be arranged between a resin reservoir and the first port.

According to a further exemplary embodiment of the present invention a flow channel for the matrix material is provided on the inside of the second gastight chamber due to the form of the granulated material while negative pressure is applied at the second port. In this case, the first and the second vacuum foils may be sealed to each other, after the granulated material is disposed between the foils. Furthermore, the thus formed second chamber may be preformed and evacuated through the second port such that the granulated material is stiffened. Therein, the second chamber is preformed in such a way that a flow channel is formed on the surface of the granulated material or on the surface of the second gastight chamber. This surface is orientated to face the first rigid tool part and the semi-finished fiber material. Subsequently, the first and/or the second vacuum foil is sealed to the first rigid tool part. Thus, a flow channel for distributing the matrix material within the first gastight chamber is provided. Alternatively, in this way several flow channels possibly with a variable form may be provided. Therein, the flow channel may be connected to the first port.

According to a second aspect of the present invention a process for liquid composite moulding is provided. The process comprises: arranging a semi-finished fiber material between a first rigid tool part and a first vacuum foil; sealing the first vacuum foil to the first rigid tool part such that a first gastight chamber is provided between the first rigid tool part and the first vacuum foil; providing a second vacuum foil which is arrangeable in such a way at the rigid tool part that a second gastight chamber is formed between the first vacuum foil and the second vacuum foil; arranging a granulated material between the first vacuum foil and the second vacuum foil; applying a first negative pressure to the second gastight chamber; and supplying matrix material via a first port into the first gastight chamber.

The sequence of the method steps may vary. For example, first the second vacuum foil is arranged over the granulated material and the first vacuum foil and subsequently the first vacuum foil is sealed to the first rigid tool part. Moreover, the method may comprise additional steps such as for example curing the semi-finished fiber material saturated or impregnated with matrix material. The terms process and method are used synonymously. The method or process may be executed with the system described above.

The method may be employed for producing a fiber composite component, e.g. a part of a fuselage or skin of an airplane. According to an exemplary embodiment, as a first step a first rigid tool part may be provided. In a next step, the semi-finished fiber material is arranged on top of the first rigid tool part. Furthermore, a first vacuum foil is placed on top of the semi-finished fiber material. At this point, the first vacuum foil may be gastightly sealed to the first rigid tool part to form a first gastight chamber in which the semi-finished fiber material is arranged. Alternatively, the first vacuum foil may be sealed at a later stage to the first rigid tool part.

The granulated material, possibly arranged in a casing, may be placed as a next layer on top of the first vacuum foil. Furthermore, the second vacuum foil may be arranged as a final layer on top of the granulated material. The second vacuum foil may be gastightly sealed to the first vacuum foil before or after the first vacuum foil is sealed to the first rigid tool part. Therein, the first vacuum foil and the second vacuum foil form a second gastight chamber in which the granulated material is arranged.

The first gastight chamber is accessible through a first port and through a third port. Furthermore, the second gastight chamber is accessible through a second port. A first negative pressure is applied to the second gastight chamber via a second port. In this way the whole built-up below the second chamber is fixed by the vacuum mattress consisting of the first vacuum foil, the second vacuum foil and the granulated material.

Subsequently, previously or simultaneously to applying the first negative pressure to the second gastight chamber, a second negative pressure may be applied to the first gastight chamber. Therein, the second negative pressure may be higher than the first negative pressure, i.e. the vacuum in the in the first gastight chamber is greater than the vacuum in the second gastight chamber. In other words, the nominal pressure in the first gastight chamber is lower than in the second gastight chamber.

Subsequently or simultaneously to applying the second negative pressure to the first gastight chamber a matrix material is supplied or infused into the first gastight chamber via the first port. In a further step, the semi-finished fiber material which is soaked with matrix material is cured within the first gastight chamber. Moreover, positive pressure is supplied to the second gastight chamber via the second port such that the vacuum mattress collapses. Furthermore, positive pressure may be supplied to the first gastight chamber via the third port such that the finished composite component may be removed from the first gastight chamber.

According to a further exemplary embodiment of the present invention the process further comprises applying a second negative pressure to the first gastight chamber via a third port. Therein, the first negative pressure is higher than the second negative pressure and is selected in such a way that it positively influences, i.e. enhances, the matrix material permeability of the semi-finished fiber material. For example, the first negative pressure applied to the second gastight chamber may result in a nominal pressure of 3 to 20 mbar within the second gastight chamber. Furthermore, the second negative pressure applied to the first gastight chamber may result in a nominal pressure of 50 to 100 mbar within the first gastight chamber.

According to a further exemplary embodiment of the present invention the process further comprises applying a third negative pressure to the first gastight chamber after supplying matrix material into the first gastight chamber; and postforming the semi-finished fiber material infused with matrix material by simultaneously or subsequently applying a forth positive pressure to the second gastight chamber.

In other words, after the semi-finished fiber material is soaked with resin the originally applied second negative pressure is varied and is thus denoted as a third negative pressure. E.g. the vacuum in the first gastight chamber may be increased. Moreover, at the same time a forth positive pressure is applied to the second gastight chamber. Thereby, the second gastight chamber is relaxed and allows for the first gastight chamber to be evacuated even more. Thus, the semi-finished material is postformed, i.e. shaped by the additional vacuum.

According to a further exemplary embodiment of the present invention the process further comprises preforming the second gastight chamber with the granulated material before applying the second negative pressure. In this embodiment the first vacuum foil is positioned on a tool. The tool may for example have the negative form of a stringer to be attached to the aircraft skin produced in the liquid composite moulding process. Furthermore, the granulated material is arranged on the first vacuum foil. Moreover, the second vacuum foil is arranged on the granulated material and the second vacuum foil is sealed gastightly to the first vacuum foil. Thereby, the second gastight chamber is formed. A first negative pressure is applied to the second gastight chamber. Furthermore, the second gastight chamber is positioned at the first rigid tool part such that the first vacuum foil faces the semi-finished fiber material. Subsequently, the first vacuum foil is sealed to the first part of the first rigid tool.

In other words the second gastight chamber with the granulated material may be used as a collapsible positioning device e.g. for stringers. With the help of the preformed second gastight chamber elements such as undercuts may be incorporated into the finished composite part. Moreover, the second gastight chamber may be preformed to comprise on its surface a flow channel to enhance the distribution of the matrix material in the first gastight chamber.

According to a further exemplary embodiment of the present invention the matrix material is supplied to the first gastight chamber in a pulsed manner. This enhances the even distribution of the matrix material on the semi-finished fiber material and the soaking of the semi-finished fiber material with the matrix material.

According to a third aspect of the present invention the use of granulated material for a liquid composite moulding process is provided. Particularly, the granulated material may be advantageously employed in a process described above.

It has to be noted that embodiments of the invention are described with reference to different subject matters. In particular, some embodiments are described with reference to method type claims whereas other embodiments are described with reference to device or system type claims. However, a person skilled in the art will gather from the above and the following description that, unless otherwise notified, in addition to any combination of features belonging to one type of subject matter also any combination between features relating to different subject matters is considered to be disclosed with this application. The features may be combined providing synergetic effects that are more than the simple summation of the features.

BRIEF DESCRIPTION OF THE DRAWINGS

Exemplary embodiments of the invention will be described in the following with reference to the following drawings.

DETAILED DESCRIPTION

Figure 1:
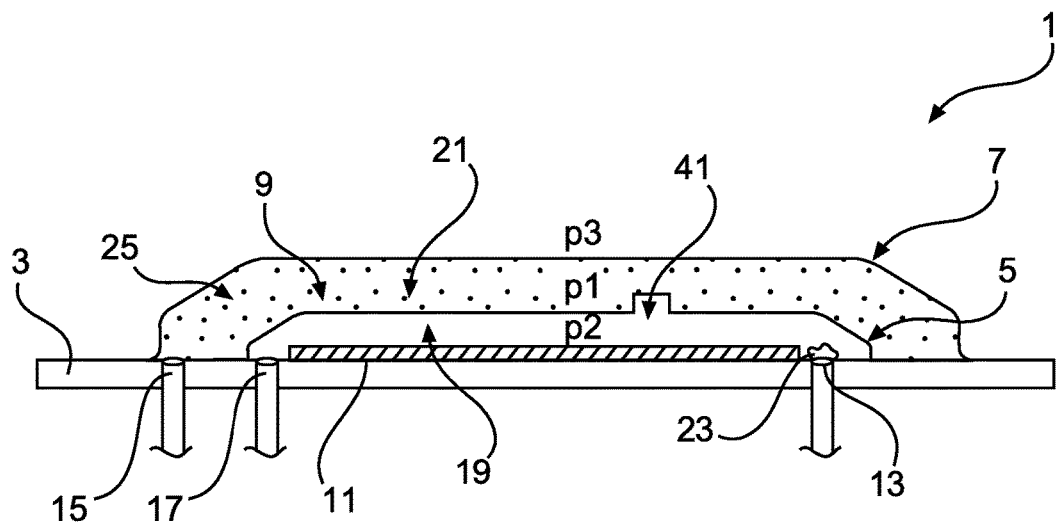
FIG. 1 shows schematically a cross section of a system according to a first exemplary embodiment of the invention.

In FIG. 1 a cross sectional view on a system 1 for liquid composite moulding is presented. The system 1 comprises a first rigid tool part 3 onto which a semi-finished fiber material 11 is positioned. Furthermore, the system comprises a first vacuum foil 5, a second vacuum foil 7 and granulated material 9. The first vacuum foil 5 is sealed to the first rigid tool part 3 such that a first gastight chamber 19 is formed between the first vacuum foil 5 and the first rigid tool part 3. The semi-finished fiber material 11 is located in the first gastight chamber 19.

A first port 13 is provided at the first gastight chamber 19 in such a way that a matrix material 23 is infusible into the first gastight chamber 19 via the first port 13. Therein, in the shown embodiments the first port 13 is provided as an inlet in the first rigid tool part 3. However, the first port 13 may also be provided for example in the first vacuum foil 5.

The second vacuum foil 7 is positioned on top of the first vacuum foil 5. Between the first vacuum foil 5 and the second vacuum foil 7 a second gastight chamber 21 is formed, when the second vacuum foil 7 is sealed to the first vacuum foil 5. Therein, the granulated material 9 is arranged within the gastight chamber 21. Particularly, a granulated material 9 such as fired clay may be employed. A second port 15 is provided at the second gastight chamber 21 for applying a negative pressure p1 to the second gastight chamber 21. When negative pressure p1 is applied to the second port 15 the second gastight chamber 21 is evacuated and the granulated material 9 forms a second rigid tool part 25.

Figure 3:
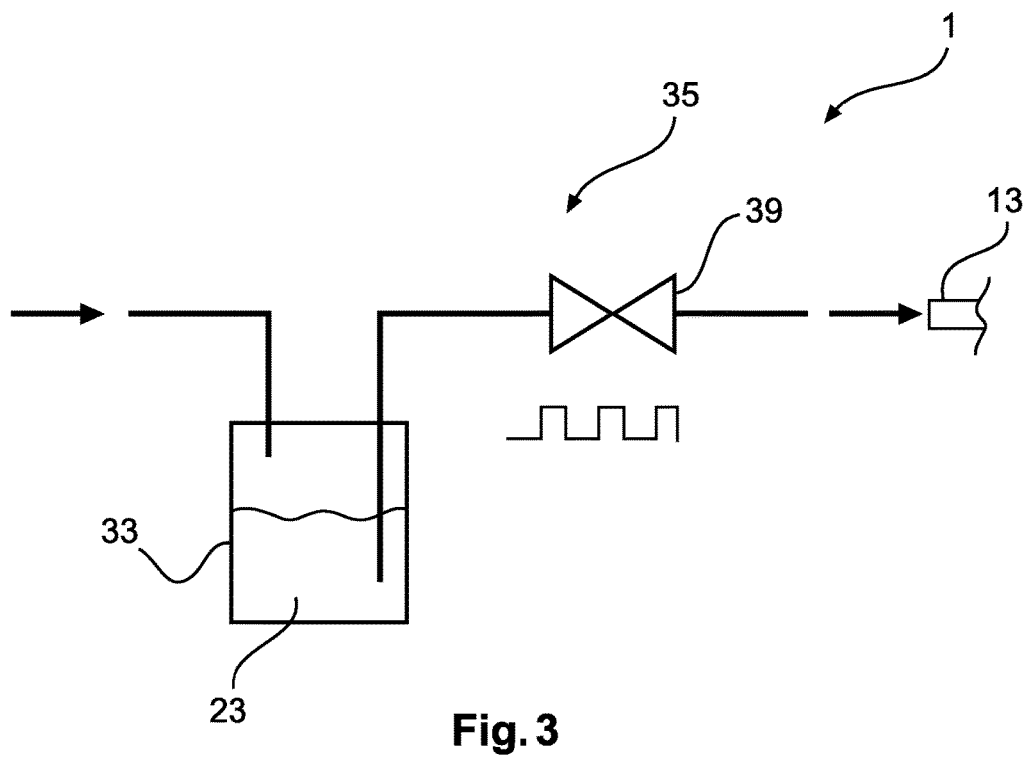
FIG. 3 shows schematically a cross section of a pressurized supply of matrix material for a system according to an exemplary embodiment of the invention.
Figure 4:
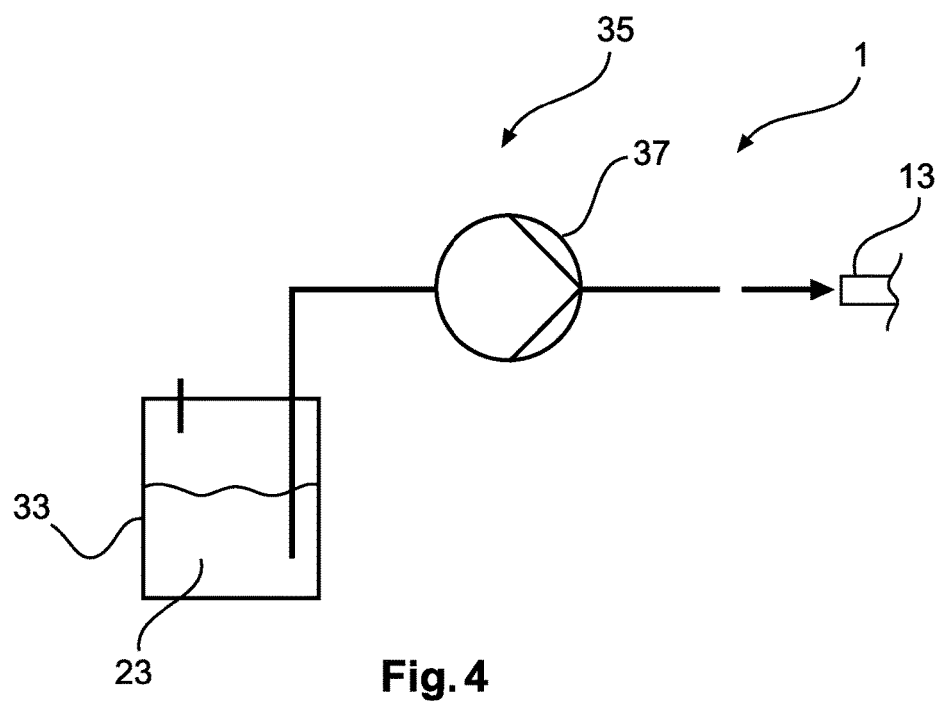
FIG. 4 shows schematically a cross section of a pressurized supply of matrix material for a system according to a further exemplary embodiment of the invention.

Thus, the system 1 comprises a first rigid tool part 3 and a second tool part 25 which may be stiffened and collapsed on demand. The second tool part 25 is constituted by the first vacuum foil 5, the second vacuum foil 7 and the granulated material 9. The second tool part 25 may function similarly to a vacuum mattress or a caul plate. Due to the granulated material 9 and the stiffenable second tool part 25 the system 1 allows for pressure assisted matrix material 23 supplies. The matrix material 23 may e.g. be provided to the first gastight chamber 19 with the help of a peristaltic pump 37 as shown in FIG. 3 or a periodically opening valve 39 as shown in FIG. 4.

Particularly, the use of the granulated material 9 enhances the reproducibility of the composite part produced from the semi-finished fiber material 11. Furthermore, the use of granulated material 9 allows to create quickly, easily adaptable, complex shaped and reusable caul plates, which are easy available, not harmful and applicable to high temperature curing.

Moreover, the first gastight chamber 19 comprises a third port 17 through with a second negative pressure p2 may be applied to the first gastight chamber 19. In the shown embodiments the third port 17 is provided at the first rigid tool part 3 between the first vacuum foil 5 and the second vacuum foil 7. However, the third port 17 may also be provided in the first vacuum foil 5. By evacuating the first gastight chamber 19 the distribution of the matrix material 23 through the semi-finished fiber material 11 is enhanced. Therein, the first negative pressure p1 may differ from the second negative pressure p2. Furthermore, both negative pressures p1, p2 differ from, and particularly are smaller than an ambient pressure p3.

Furthermore, a flow channel 41 is provided on the surface of the second gastight chamber 21 shown in FIG. 1. The flow channel 41 may be in fluid communication with the first port 13 and enhance the distribution of the matrix material 23. For providing the flow channel 41 the second gastight chamber 21 may be preformed as explained with respect to FIG. 6.

Figure 2:
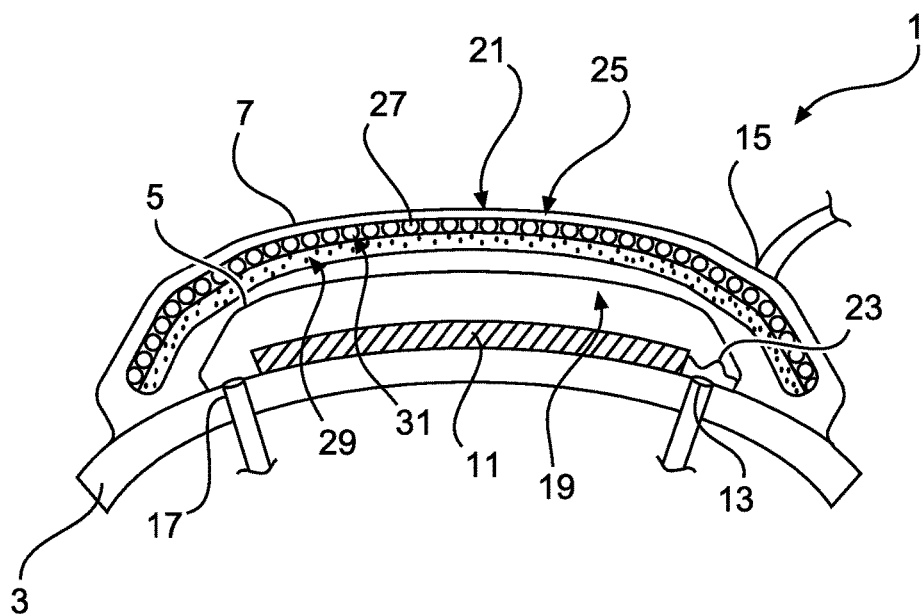
FIG. 2 shows schematically a cross section of a system according to a second exemplary embodiment of the invention.

In FIG. 2 a system 1 according to a second embodiment is shown. The system 1 of FIG. 2 is similar to the system 1 shown in FIG. 1. However, in FIG. 2 the second port 15 providing access to the second gastight chamber 21 is arranged at the second vacuum foil 7. Furthermore, the granulated material 9 is arranged within a flexible casing 27 in the second gastight chamber 21. The flexible casing 27 is deformable and comprises a non-woven fabric material such as a felt-like cloth or fleece. The flexible casing 27 allows for an easy storage, handling and positioning of the granulated material 9.

The flexible casing 27 may comprise one cavity in which all the granulated material 9 is disposed. In the embodiment shown in FIG. 2 the flexible casing 27 comprises a first cavity 29 and a separate second cavity 31. Thus, the granulated material 9 is divided into two layers. The particles of the granulated material 9 in the first cavity 29 have a smaller size than the particles of the granulated material 9 in the second cavity 31. In this way, certain structures or surface geometries of the composite part to be finished may be enhanced.

FIG. 3 and FIG. 4 show a supply of matrix material 23 connectable to the first port 13 at the first gastight chamber 19 as shown in FIG. 1 and FIG. 2. Therein, the supply of matrix material 23 is a pressurized supply 35 of matrix material 23 which is enabled by the stiffenable second gastight chamber 21 with the granulated material 9. The pressurized supply 35 of matrix material 23 comprises a reservoir 33 of matrix material 23 and is adapted to supply the matrix material 23 in a pulsated manner to the first port 13.

According to the embodiment in FIG. 3 the pressurized supply 35 of matrix material 23 further comprises a periodically opening valve 39. Moreover, a pressurized gas, e.g. air, is supplied to the reservoir 33. This is indicated with the arrow on the left side of FIG. 3. The pressure within the reservoir 33 is increased with the pressurized air. Due to this increased pressure the matrix material 23 flows to the first port 13 when the valve 39 is open.

In the embodiment of FIG. 4 the pressurized supply 35 of matrix material 23 comprises a peristaltic pump 37 instead of the pressurized air supply and the valve 39. The peristaltic pump 37 moves portions of the matrix material 23 to the first port 13.

Figure 5:
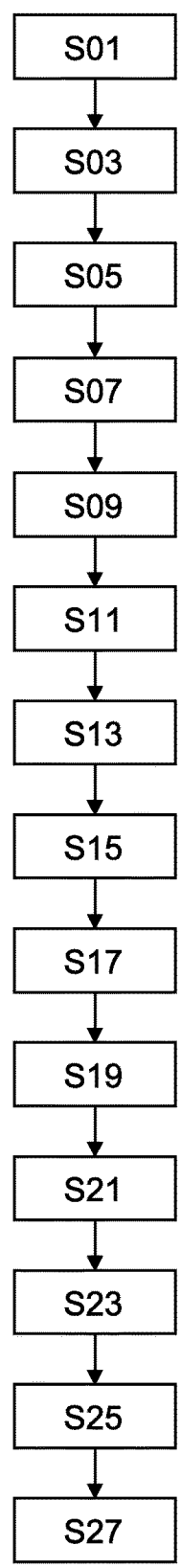
FIG. 5 shows a flow chart of a method for liquid composite moulding according to a first embodiment of the invention.

In FIG. 5 a flow chart of a method for liquid composite moulding applicable e.g. with the system 1 shown in FIGS. 1 and 2 is presented. The sequence of the steps may vary and FIG. 5 is only an example of a possible sequence. Therein, in a first step S01 a first rigid tool part 3 is provided. Furthermore, in step S03 the semi-finished fiber material 11 is arranged on top of the first rigid tool part 3. In step S05 a first vacuum foil 5 is placed on top of the semi-finished fiber material 11. Moreover, in step S07 the first vacuum foil 5 is gastightly sealed to the first rigid tool part 3 to form a first gastight chamber 19 in which the semi-finished fiber material 11 is arranged.

In step S09 the granulated material 9, possibly arranged in a flexible casing 27, is placed on top of the first vacuum foil 5. Subsequently, in step S11 the second vacuum foil 7 is placed on top of the granulated material 9. Then, in step S13 the second vacuum foil 7 is gastightly sealed to the first vacuum foil 5 to form a second gastight chamber 21 in which the granulated material 9 is arranged. In step S15 a first negative pressure p1 is applied to the second gastight chamber 21 via a second port 15. In this way, the whole built-up below the second gastight chamber 21 is fixed by the vacuum mattress consisting of the first vacuum foil 5, the second vacuum foil 7 and the granulated material 9.

Moreover, a second negative pressure p2 is applied to the first gastight chamber 19 via the third port 17 in step S17. Furthermore, in step S19 the matrix material 23 is supplied into the first gastight chamber 19 via the first port 13. For example, steps S17 and S19 may be executed simultaneously or subsequently. In step S21 the semi-finished fiber material 11 soaked with matrix material 23 is cured within the first gastight chamber 19. Furthermore, in step S23 a positive pressure is applied to the second gastight chamber 21 via the second port 15 such that the vacuum mattress collapses. In step S25 a positive pressure is applied to the first gastight chamber 19 via the third port 17. Steps S23 and S25 help in releasing the finished composite part from the system 1. In step S27 the finished composite component is removed from the first gastight chamber 19.

Figure 6:
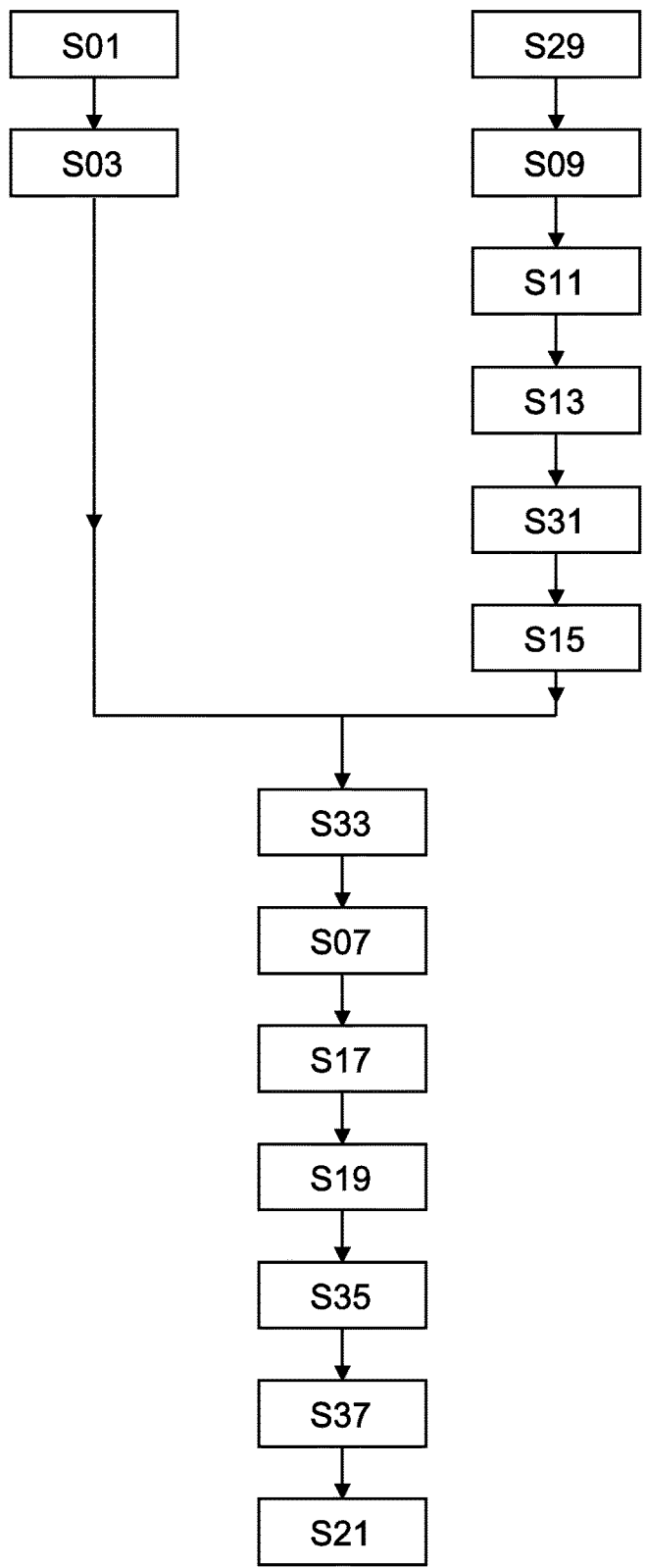
FIG. 6 shows a flow chart of a method for liquid composite moulding according to a second embodiment of the invention.

In FIG. 6 a flow chart of a method for liquid composite moulding with an alternative sequence and composition of steps is presented. Similarly to FIG. 5, in step S01 a first rigid tool part 3 is provided and the semi-finished fiber material 11 is arranged on top of the first rigid tool part 3 in step S03. Steps S29, S09, S11, S13, S31 and S15 are executed before, after or at the same time as steps S01 and S03.

Therein, in step S29 the first vacuum foil 5 is positioned on a tool which is not the first rigid tool part 3. Furthermore, in step S09 the granulated material 9 is placed on top of the first vacuum foil 5. In step S11 the second vacuum foil 7 is placed on top of the granulated material 9 and in step S13 the second vacuum foil 7 is gastightly sealed to the first vacuum foil 5 to form a second gastight chamber 21. Subsequently, the second gastight chamber 21 is preformed in step S31. For example, the preforming may comprise shaping the surface of the second gastight chamber 21 to correspond to a stringer to be connected to the composite part. Alternatively, the surface of the second gastight chamber 21 may be preformed to comprise a flow channel 41 for the matrix material 23. After or during performing the first negative pressure p1 is applied to the second gastight chamber 21 via a second port 15 to fix the second gastight chamber 21 in the preformed shape.

Furthermore, in step S33 the preformed second gastight chamber 21 is positioned on the first rigid tool part 3 such that the first vacuum foil 5 faces the semi-finished fiber material 11. Subsequently, in step S07 the first vacuum foil 5 is gastightly sealed to the first rigid tool part 3 to form a first gastight chamber 19 in which the semi-finished fiber material 11 is arranged. Moreover, in step S17 a second negative p2 pressure is applied to the first gastight chamber 19 via the third port 17. In step S19 matrix material 23 is supplied into the first gastight chamber 19 via the first port 13.

Moreover, in step S35 a third negative pressure is applied to the first gastight chamber 19 after supplying matrix material 23 into the first gastight chamber 19. Subsequently or at the same time, the semi-finished fiber material 11 infused with matrix material 23 is postformed in step S37 by applying a forth positive pressure to the second gastight chamber 21. In this way, by varying or e.g. increasing the vacuum in the first gastight chamber 19 and decreasing the vacuum in the second gastight chamber 21 the distribution of the matrix material 23 within the first gastight chamber 19 may be enhanced.

Subsequently, in step S21 the semi-finished fiber material 11 soaked with matrix material 23 is cured within the first gastight chamber 19. Furthermore, steps S23 to S27 may be executed after curing the semi-finished fiber material 11 as shown in FIG. 5.

Summing up, the granulated material 9 containing e.g. fired clay has a very low density and does not influence the infusion and curing behavior due to its low weight. For the use in pressure assisted matrix material infusion processes the "pillow", i.e. flexible casing 27 with granulated material 9, is put above the first vacuum foil 5 of the vacuum built-up and formed towards the desired geometry. Then, the second vacuum foil 7 is applied above the "pillow" and by extraction of the air between the first and second vacuum foils 5, 7 the geometry is fixed similarly to a vacuum mattress.

By applying only a small vacuum or pressure difference under the first vacuum foil 5, before fixing the whole built-up by the vacuum mattress the matrix material permeability of the semi-finished fiber material 11 may be influenced. After forcing the matrix material 23 into the first gastight chamber 19 e.g. with a peristaltic pump 37, the final distribution of the matrix material 23 into the semi-finished fiber material 11 may be done by increasing the vacuum under the first vacuum foil 5 and simultaneously releasing the vacuum in the second gastight chamber 21. The vacuum mattress than collapses and the ambient pressure p3 leads to the same matrix material distribution as in classic Vacuum Assisted Resin Transfer processes (VARI processes).

For the use as a caul plate the "pillow" is put in between two vacuum foils 5, 7 and formed over a tooling with the desired geometry. Then, the thus formed second gastight chamber 21 is fully evacuated and the "pillow" stays in the formed geometry. Now it positioned at the composite built-up and where it is needed. The placing is possible under or above every layer of the system 1.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims. In the claims, the word "comprising" does not exclude other elements or steps, and the indefinite article "a" or "an" does not exclude a plurality. Any reference signs in the claims should not be construed as limiting the scope.

LIST OF REFERENCE SIGNS 1 system
3 first rigid tool part
5 first vacuum foil
7 second vacuum foil
9 granulated material
11 semi-finished fiber material
13 first port
15 second port
17 third port
19 first gastight chamber
21 second gastight chamber
23 matrix material (resin)
25 second rigid tool part
27 flexible casing
29 first cavity of the flexible casing
31 second cavity of the flexible casing
33 reservoir of matrix material
35 pressurized supply of matrix material
37 peristaltic pump
39 periodically opening valve
41 flow channel
p1 first negative pressure
p2 second negative pressure
p3 ambient pressure
S01 providing a first rigid tool part
S03 arranging the semi-finished fiber material on top of the first rigid tool part
S05 placing a first vacuum foil on top of the semi-finished fiber material
S07 gastightly sealing the first vacuum foil to the first rigid tool part to form a first gastight chamber in which the semi-finished fiber material is arranged
S09 placing the granulated material, possibly arranged in a casing, on top of the first vacuum foil
S11 placing the second vacuum foil on top of the granulated material
S13 gastightly sealing the second vacuum foil to the first vacuum foil to form a second gastight chamber in which the granulated material is arranged
S15 applying a first negative pressure to the second gastight chamber via a second port
S17 applying a second negative pressure to the first gastight chamber via the third port
S19 supplying a matrix material into the first gastight chamber via the first port
S21 curing the semi-finished fiber material soaked with matrix material within the first gastight chamber
S23 applying positive pressure to the second gastight chamber via the second port such that the vacuum mattress collapses
S25 applying positive pressure to the first gastight chamber via the third port
S27 removing the finished composite component from the first gastight chamber
S29 positioning the first vacuum foil on a tool
S31 preforming the second gastight chamber
S33 positioning the preformed second gastight chamber on the first rigid tool part such that the first vacuum foil faces the semi-finished fiber material
S35 applying a third negative pressure to the first gastight chamber after supplying matrix material into the first gastight chamber
S37 postforming the semi-finished fiber material infused with matrix material by applying a forth positive pressure to the second gastight chamber

The invention claimed is:

1. A system for liquid composite moulding, the system comprising:
 a first rigid tool part;
 a second tool part configured to be selectively stiffened and collapsed, the second tool part comprising:
  a first vacuum foil;
  a second vacuum foil; and
  a granulated material;
  wherein the first vacuum foil is arrangeable in such a way on the first rigid tool part that a first gastight chamber is provided between the first vacuum foil and the first rigid tool part;
  wherein a first port is provided at the first gastight chamber in such a way that a semi-finished fiber material positioned between the first rigid tool part and the first vacuum foil is infusible with a matrix material via the first port;
  wherein between the first vacuum foil and the second vacuum foil a second gastight chamber is provided in which the granulated material is arranged;
  wherein a second port is provided at the second gastight chamber for applying a negative pressure to the second gastight chamber; and
  wherein the granulated material is adapted for stiffening the second tool part when negative pressure is applied to the second port.

2. The system according to claim 1, wherein the granulated material comprises at least one of the following materials: fired clay, glass beads, glass sand, rice, coffee powder, metal ball bearings and plastic granulate.

3. The system according to claim 1, wherein the granulated material comprises at least two different sizes of granulate particles.

4. The system according to claim 1, wherein the granulated material is provided in a flexible casing.

5. The system according to claim 4,
wherein the flexible casing comprises a first cavity and a separate second cavity; and
wherein the particles of the granulated material in the first cavity have a smaller size than the particles of the granulated material in the second cavity.

6. The system according to claim 1, further comprising:
a pressurized supply of matrix material;
wherein the pressurized supply of matrix material is connected to the first port.

7. The system according to claim 6,
wherein the pressurized supply of matrix material is operable in a pulsating manner; and
wherein the pressurized supply of matrix material comprises a peristaltic pump and/or a periodically opening valve.

8. The system according to claim 1, wherein a flow channel for matrix material is provided on the outside of the second gastight chamber due to the form of the granulated material while negative pressure is applied at the second port.

* * * * *